United States Patent
Tachi

(10) Patent No.: US 10,101,954 B2
(45) Date of Patent: Oct. 16, 2018

(54) JOB PROCESSING APPARATUS THAT MANAGES HISTORY INFORMATION, METHOD OF CONTROLLING THE SAME, AND STORAGE MEDIUM

(71) Applicant: CANON KABUSHIKI KAISHA, Tokyo (JP)

(72) Inventor: Daiki Tachi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/602,803

(22) Filed: May 23, 2017

(65) Prior Publication Data
US 2017/0255429 A1    Sep. 7, 2017

Related U.S. Application Data

(63) Continuation of application No. 15/181,741, filed on Jun. 14, 2016, now Pat. No. 9,684,481.

(30) Foreign Application Priority Data

Jun. 23, 2015 (JP) .................................. 2015-125946

(51) Int. Cl.
*G06F 15/00* (2006.01)
*G06F 3/12* (2006.01)
(Continued)

(52) U.S. Cl.
CPC .......... *G06F 3/1273* (2013.01); *G06F 3/1207* (2013.01); *G06F 3/1285* (2013.01);
(Continued)

(58) Field of Classification Search
CPC .... G06F 3/1273; G06F 3/1207; G06F 3/1285; H04N 1/00244; H04N 1/00411; H04N 2201/0081; H04N 2201/0094
(Continued)

(56) References Cited

U.S. PATENT DOCUMENTS 9,684,481 B2 *   6/2017   Tachi ................... G06F 3/1207
2005/0237563 A1 * 10/2005  Yoshiura ............... G06F 21/608
                                                    358/1.14
(Continued)

FOREIGN PATENT DOCUMENTS

JP    2004164209 A    6/2004
JP    2010034816 A    2/2010

OTHER PUBLICATIONS

Extended European Search Report issued in European Application No. 16173073.4 dated Nov. 28, 2016.
(Continued)

*Primary Examiner* — Douglas Tran
(74) *Attorney, Agent, or Firm* — Rossi, Kimms & McDowell LLP

(57) ABSTRACT

In a job processing apparatus and a method of controlling the same according to this invention, if a setting has been made to automatically transmit history information of an executed job, history information printed by a print unit is not managed as output history information. On the other hand, if no setting has been made to automatically transmit the history information, control is performed to manage, as output history information, the history information printed by the print unit.

11 Claims, 8 Drawing Sheets

(51) Int. Cl.
*G06K 1/00* (2006.01)
*H04N 1/00* (2006.01)

(52) U.S. Cl.
CPC ..... *H04N 1/00244* (2013.01); *H04N 1/00411* (2013.01); *H04N 2201/0081* (2013.01); *H04N 2201/0094* (2013.01)

(58) Field of Classification Search
USPC .............................. 358/1.1, 1.15, 1.13, 1.14
See application file for complete search history.

(56) References Cited

U.S. PATENT DOCUMENTS

2008/0218794 A1    9/2008  Oshima
2012/0053885 A1    3/2012  Kato

OTHER PUBLICATIONS

Notice of Allowance issued in U.S. Appl. No. 15/181,741 dated Feb. 28, 2017.

* cited by examiner

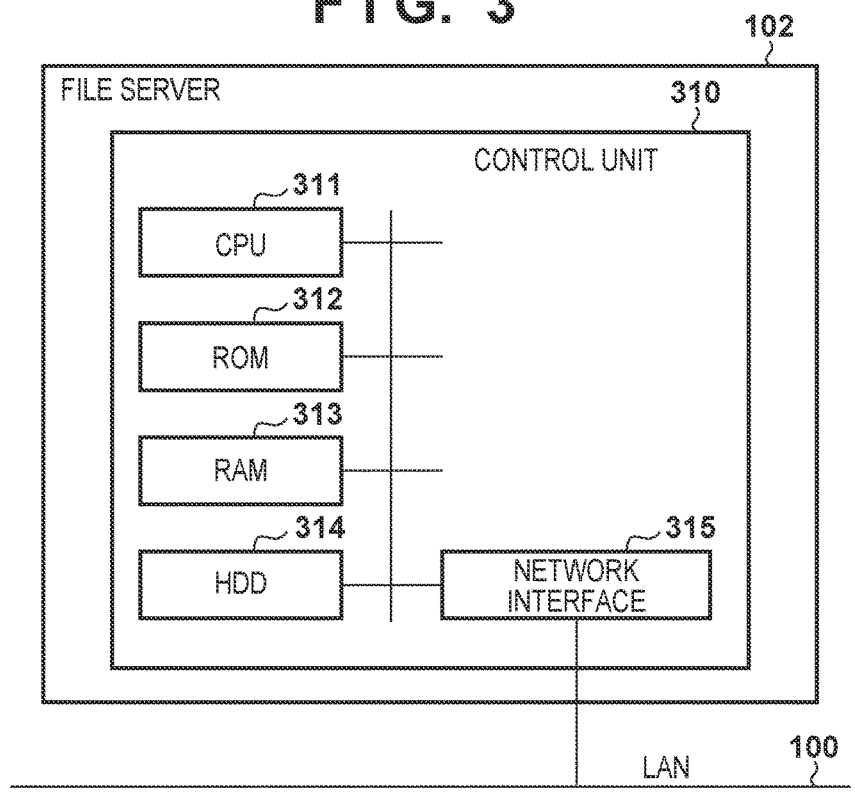

FIG. 7

TRANSMISSION HISTORY DATABASE

| DATE AND TIME | DESTINATION ADDRESS | PROTOCOL | RECEPTION NUMBER | RESULT | OUTPUT FLAG |
|---|---|---|---|---|---|
| 3/16 9:09 | server.abc.co.jp | SMB | 0001 | OK | DONE |
| 3/16 9:10 | server.efg.co.jp | FTP | 0002 | NG | UNDONE |
| 3/16 9:11 | abcd@efg.co.jp | Email | 0003 | NG | UNDONE |

701　702　703　704　705　706

F I G. 10

TRANSMISSION HISTORY DATABASE

| DATE AND TIME | DESTINATION ADDRESS | PROTOCOL | RECEPTION NUMBER | RESULT | PRINT FLAG | TRANSMISSION FLAG |
|---|---|---|---|---|---|---|
| 3/16 9:09 | server.abc.co.jp | SMB | 0001 | OK | DONE | DONE |
| 3/16 9:10 | server.efg.co.jp | FTP | 0002 | NG | UNDONE | UNDONE |
| 3/16 9:11 | abcd@efg.co.jp | Email | 0003 | NG | UNDONE | UNDONE |

JOB PROCESSING APPARATUS THAT MANAGES HISTORY INFORMATION, METHOD OF CONTROLLING THE SAME, AND STORAGE MEDIUM

BACKGROUND OF THE INVENTION

Field of the Invention

The present invention relates to a job processing apparatus, a method of controlling the same, and a storage medium.

Description of the Related Art

There is conventionally known an image processing apparatus capable of transmitting, to a designated destination, by email or a file transmission function, a file of image data obtained by reading a document by a scanner. The file transmission function is a function of transmitting a file using a protocol such as SMB (Server Message Block) or FTP (File Transfer Protocol).

There is also known a report print function of printing history information of transmission or the like which is managed by the image processing apparatus. A report of history information may be managed as a printed material by a user, or digitized, transmitted to a file server, and managed by the file server. When managing the digitized report of history information, it is incorporated in a business management system and operated in cooperation with the file server. This allows the administrator to readily confirm the history information.

Japanese Patent Laid-Open No. 2010-34816 describes a technique in which a user transmits the contents of a report from an image processing apparatus by email.

The above-described report print function includes manual output of printing a report of history information in accordance with a user instruction, and automatic output of automatically printing a report of history information in accordance with conditions. When automatically printing the report of history information, the history information to be printed is that which has never been printed. For example, when the number of pieces of history information which have not been printed reaches a number designated in advance, a report of history information is automatically printed.

At this time, history information for which a report has been printed in accordance with a user instruction is considered to have been output, and is thus not the target to be automatically output, for which a report is to be automatically printed. History information printed by a manual operation by the user is excluded from the automatic report output targets. However, if the user leaves a printed material printed by the manual operation, the user can manage a series of pieces of history information together with a material to be printed later.

However, in an environment where a digitized report of history information is transmitted to an external apparatus and the external apparatus manages the history information, the history information printed by the manual operation by the user is undesirably excluded from the above-described automatic output (transmission) targets. Therefore, the history information printed by the manual operation by the user is not included in the pieces of history information managed by the external apparatus. As a result, a loss of information occurs in the pieces of history information managed by the external apparatus, and the external apparatus cannot manage correct pieces of history information.

SUMMARY OF THE INVENTION

An aspect of the present invention is to eliminate the above-mentioned problems with conventional technology.

A feature of the present invention is to provide a technique of preventing history information printed by a user instruction from being lost from a communication management report to be transmitted.

According to a first aspect of the present invention, there is provided a job processing apparatus comprising: an executing unit configured to execute a job; a storage unit configured to store history information of the job executed by the executing unit; a print unit configured to print, in accordance with a user instruction, the history information stored in the storage unit; a transmitting unit configured to automatically transmit history information that is not managed as output history information, among the pieces of history information stored in the storage unit; and a control unit configured to control not to manage, as the output history information, the history information printed by the print unit if a setting has been made to automatically transmit the history information by the transmitting unit, and to manage, as the output history information, the history information printed by the print unit if no setting is made to automatically transmit the history information by the transmitting unit.

According to a second aspect of the present invention, there is provided a job processing apparatus comprising: an executing unit configured to execute a job; a storage unit configured to store history information of the job executed by the executing unit; a print unit configured to print the history information stored in the storage unit; a transmitting unit configured to transmit the history information stored in the storage unit; a management unit configured to manage, as printed history information, the history information printed by the print unit, and manage, as transmitted history information, the history information transmitted by the transmitting unit; and a control unit configured to control the print unit to print the history information that is not managed as the printed history information by the management unit, and control the transmitting unit to transmit the history information that is not managed as the transmitted history information by the management unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram for explaining the hardware arrangement of a file server according to the first embodiment;

FIG. 4 depicts a view showing an example of an operation screen displayed on a display unit of a console unit of the MFP according to the first embodiment;

FIG. 7 depicts a view illustrating an example of the structure of data of a transmission history database stored in an HDD of the MFP according to the first embodiment;

FIG. 10 depicts a view illustrating an example of the structure of data of a transmission history database stored in an HDD of an MFP according to the second embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

The first embodiment of the present invention will be described.

Figure 1:
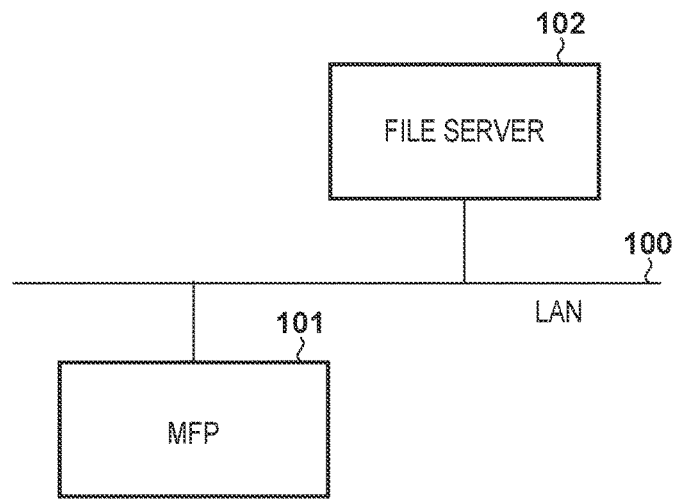
FIG. 1 depicts a view showing the overall configuration of an image processing system according to the first embodiment of the present invention.

FIG. 1 depicts a view showing the overall configuration of an image processing system according to the first embodiment of the present invention.

In this system, an MFP (Multifunction Peripheral) 101 and a file server 102 are communicably connected to a LAN (Local Area Network) 100. The MFP 101 is an example of a job processing apparatus according to the present invention, and the file server 102 is an example of a file management apparatus according to the embodiment.

The MFP 101 can transmit an image file using SMB or FTP by setting a folder in the file server 102 as a destination. The MFP 101 can transmit an image file by designating, as an external apparatus, a folder in a client PC (not shown) instead of the file server 102. The MFP 101 can also transmit an image file by email via a mail server (not shown). Note that the image processing system includes the MFP 101 and the file server 102 but only the MFP 101 can be referred to as an image processing system.

Figure 2:
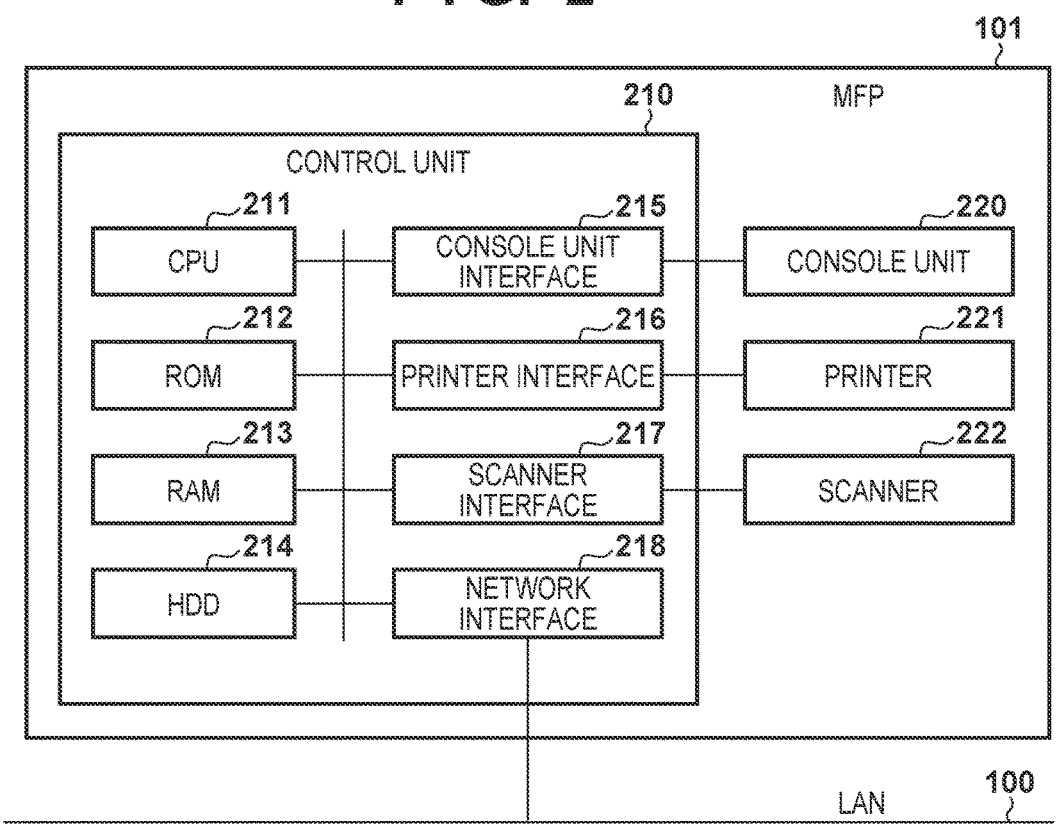
FIG. 2 is a block diagram for explaining the hardware arrangement of an MFP according to the first embodiment.

FIG. 2 is a block diagram for explaining the hardware arrangement of the MFP 101 according to the first embodiment.

A control unit 210 including a CPU 211 controls the overall operation of the MFP 101. The CPU 211 executes a boot program stored in a ROM 212 to deploy, to a RAM 213, a program installed in an HDD 214, and executes the program deployed in the RAM 213, thereby performing various control operations such as a reading control operation and transmission control operation. Note that, in the MFP 101, the one CPU 211 executes respective processes shown in flowcharts (to be described later) using one memory (the RAM 213). However, other forms may be adopted. For example, a plurality of CPUs and a plurality of RAMs may cooperate with each other to execute the respective processes shown in the flowcharts (to be described later). The HDD (Hard Disk Drive) 214 stores image data and various programs. The HDD 214 also stores information such as a transmission history (to be described later).

A console unit interface 215 connects a console unit 220 and the control unit 210. The console unit 220 includes a keyboard and a display unit having a touch panel function. A printer interface 216 connects a printer 221 and the control unit 210. Image data to be printed by the printer 221 is transferred from the control unit 210 to the printer 221 via the printer interface 216, and printed on a sheet by the printer 221. A scanner interface 217 connects a scanner 222 and the control unit 210. The scanner 222 reads an image on a document, generates image data (image file), and inputs it to the control unit 210 via the scanner interface 217. This enables the MFP 101 to transmit the image data (image file) generated by the scanner 222 using the file transmission function or email. A network interface 218 connects the control unit 210 (MFP 101) to the LAN 100. The network interface 218 transmits image files and various kinds of information to the external apparatus (file server 102) connected to the LAN 100, and receives various kinds of information from the external apparatus on the LAN 100.

FIG. 3 is a block diagram for explaining the hardware arrangement of the file server 102 according to the first embodiment.

A control unit 310 including a CPU 311 controls the overall operation of the file server 102. The CPU 311 executes a boot program stored in a ROM 312 to read out a program stored in an HDD 314 and deploy it to a RAM 313, and executes the deployed program, thereby executing various kinds of control processes. The RAM 313 is used as a main memory and a temporary storage area such as a work area for the CPU 311. The HDD 314 stores image data and various kinds of programs. A network interface 315 connects the file server 102 to the LAN 100. The network interface 315 transmits/receives various kinds of information to/from another apparatus connected to the LAN 100.

FIG. 4 depicts a view showing an example of an operation screen displayed on the display unit of the console unit 220 of the MFP 101 according to the first embodiment. Note that the operation screen is displayed when settings for transmitting transmission histories in the MFP 101 are registered.

A print button 401, a send button 402, and an OFF button 403 are buttons for selecting an operation when the number of transmission operations by the MFP 101 reaches the number designated in advance. In this example, only one of the print button 401, send button 402, and OFF button 403 is exclusively selected. If the print button 401 is selected, when the number of transmission operations by the MFP 101 reaches the number designated in advance, the printer 221 prints pieces of transmission history information received via the printer interface 216. If the send button 402 is selected, when the number of transmission operations by the MFP 101 reaches the number designated in advance, a file in which pieces of transmission history information are described is transmitted, via the network interface 218 through the LAN 100, to a transmission destination registered in advance. In this case, the transmission destination is set in a transmission destination field 405. If the OFF button 403 is selected, pieces of transmission history information are stored in the HDD 214 but are neither printed nor transmitted.

A communication frequency field 404 is an area for setting the above-described predetermined number designated in advance, and "100" is set in this example. In this state, for example, if the print button 401 is selected, when the number of transmission operations by the MFP 101 reaches "100", the printer 221 prints, as a communication management report, a file in which pieces of transmission history information are described. Alternatively, for example, if the send button 402 is selected, when the number of transmission operations by the MFP 101 reaches "100", a file in which pieces of transmission history information are described is transmitted as a communication management report, to the transmission destination set in the transmission destination field 405, via the network interface 218 through the LAN 100.

Note that if a time or date and time is designated, a file in which pieces of transmission history information are described may be printed or transmitted as a communication management report at the designated time or date and time.

The setting value of the transmission destination field 405 is enabled only if the send button 402 is selected, and indicates a destination to which a file in which pieces of transmission history information are described is transmitted via the network interface 218 through the LAN 100. This destination can be selected from an address book stored in the HDD 214. A selectable destination at this time is an email destination or a destination to which a file can be transmitted. In the example shown in FIG. 4, "user1" is designated as a destination.

Figure 5:
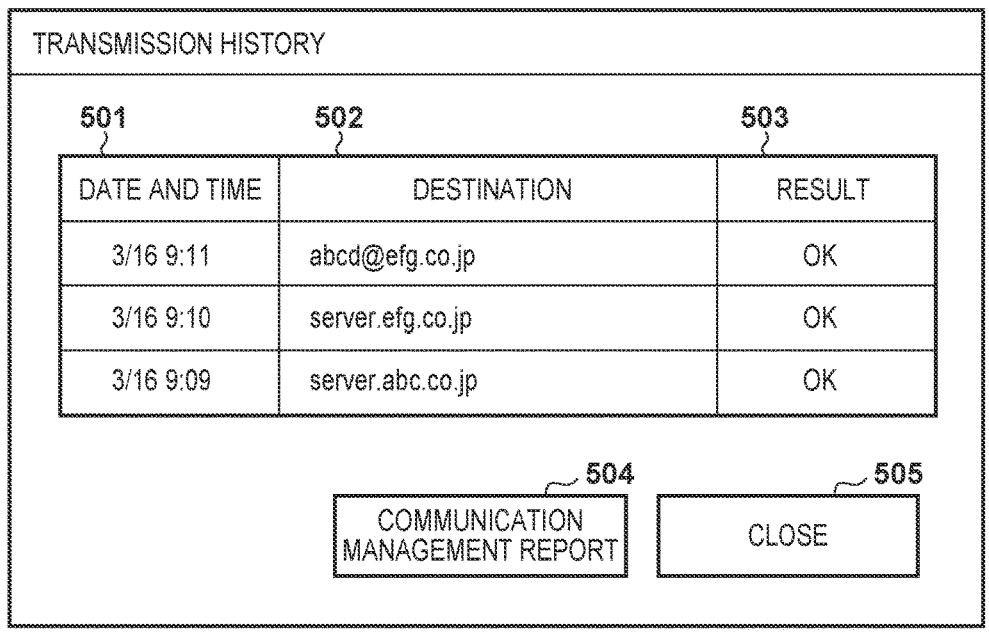
FIG. 5 depicts a view showing an example of a transmission history display screen displayed on the display unit of the console unit of the MFP according to the first embodiment.

FIG. 5 depicts a view showing an example of a transmission history display screen displayed on the display unit of the console unit 220 of the MFP 101 according to the first embodiment. The screen shown in FIG. 5 is displayed when, for example, a user presses a transmission history display button on a menu screen (not shown).

A date and time 501 indicates a date and time at which transmission of an image file or the like starts. A destination 502 indicates a destination (address) of the transmission. A result 503 stores data indicating whether a result of the transmission is success (OK) or failure (NG). Note that this information is managed in the transmission history database in the HDD 214.

A "communication management report" button 504 is a button for instructing to transit to a screen (FIG. 6) for printing a report of transmission history. When this button 504 is pressed, the screen transitions to a screen for printing the report of communication history. A close button 505 is a button for closing the currently displayed operation screen.

Figure 6:
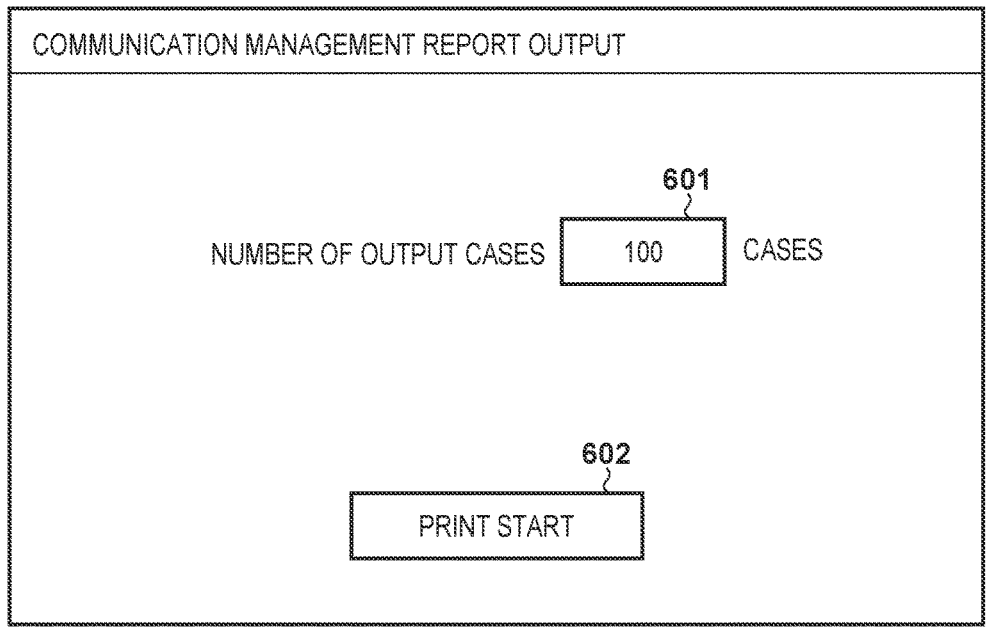
FIG. 6 depicts a view showing an example of a communication management report output screen displayed on the display unit of the console unit of the MFP according to the first embodiment.

FIG. 6 depicts a view showing an example of a communication management report output screen displayed on the display unit of the console unit 220 of the MFP 101 according to the first embodiment. This screen is displayed when the "communication management report" button 504 shown in FIG. 5 is pressed.

A number field 601 of output cases is an area for designating the number of pieces of history information to be described in a communication management report. In this example, "100" is set. Note that if the number of pieces of history information stored in the HDD 214 has not reached the set number upon outputting of the communication management report, the communication management report in which all the pieces of history information stored in the HDD 214 are described is output. A "print start" button 602 is a print instruction button used by the user to manually instruct to print a communication management report.

FIG. 7 depicts a view showing an example of the structure of data of the transmission history database stored in the HDD 214 of the MFP 101 according to the first embodiment. In the first embodiment, the information of the transmission history database is described in a transmission history report, and the report is printed or transmitted. In FIG. 7, each row indicates transmission history information.

A date and time 701 indicates a transmission start date and time of the history information. A destination address 702 indicates the address of a transmission destination. A protocol 703 indicates a protocol when the transmission was performed. A reception number 704 indicates a reception number when the transmission was performed. A result 705 indicates whether a result of the transmission is success or failure. An output flag 706 is information indicating whether or not corresponding history information has been printed or transmitted. If the history information has been printed or transmitted, "done" is set in the output flag 706, otherwise, "undone" is set. Note that if a predetermined condition is satisfied, even if printing of the history information has been executed, "done" is not set in the output flag 706, as will be described later.

Note that the transmission history information has been exemplified in FIG. 7 but a job history including a reception history information may be used.

Figure 8:
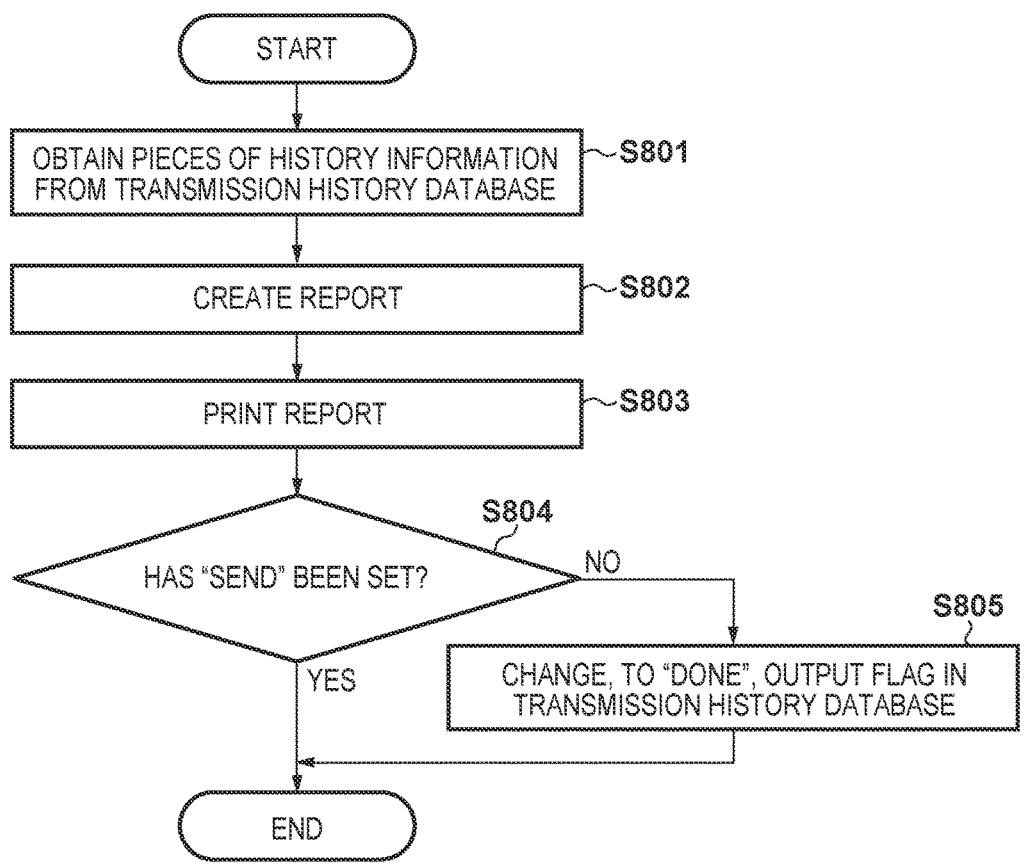
FIG. 8 is a flowchart for describing print processing of communication history report by the MFP according to the first embodiment.

FIG. 8 is a flowchart for describing print processing of communication history report by the MFP 101 according to the first embodiment. Note that this processing is implemented when the CPU 211 executes the program deployed from the HDD 214 to the RAM 213.

The print processing of communication history report starts when, for example, the user presses the "print start" button 602 on the screen shown in FIG. 6. Alternatively, the print processing starts when the print button 401 is selected on the screen shown in FIG. 4, and the number of pieces of history information whose transmission history output flag 706 registered in the transmission history database is "undone" reaches the number set in the communication frequency field 404 shown in FIG. 4.

In step S801, the CPU 211 accesses the transmission history database stored in the HDD 214 to obtain pieces of history information, and the process advances to step S802. In step S802, the CPU 211 creates a file of a printable communication history report from pieces of history information for which "undone" has been set in the output flag 706, among the pieces of history information obtained in step S801, and the process advances to step S803. In step S803, the CPU 211 outputs, to the printer 221 via the printer interface 216, the file of the communication history report created in step S802, thereby printing it. Upon completion of printing of the communication history report, the process advances to step S804, and the CPU 211 determines whether or not the send button 402 has been selected on the screen shown in FIG. 4 and a setting has been made to transmit the communication history report to the designated destination. If it is determined that transmission has been set, the process directly ends, otherwise, the process advances to step S805, and the CPU 211 changes, to "done", the output flag 706 corresponding to each piece of history information printed in step S803 in the transmission history database obtained in step S801, thereby ending the processing.

As described above, if a setting has been made to transmit the communication history report to the designated destination, even if communication history information has been printed, its output flag 706 remains "undone", and thus the communication history information is not excluded from a transmission target.

Figure 9:
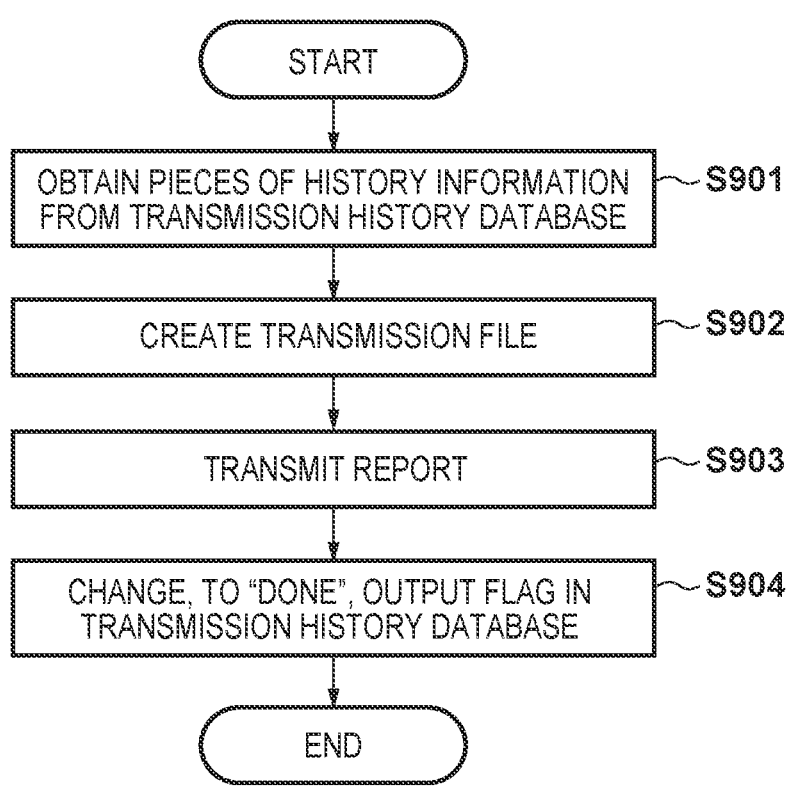
FIG. 9 is a flowchart for describing transmission processing of communication history report by the MFP according to the first embodiment.

FIG. 9 is a flowchart for describing transmission processing of communication history report by the MFP 101 according to the first embodiment. Note that this processing is implemented when the CPU 211 executes the program deployed from the HDD 214 to the RAM 213. The transmission processing of communication history report starts when, for example, the send button 402 is selected on the screen shown in FIG. 4, and the number of pieces of history information whose transmission history output flag 706 registered in the transmission history database is "undone" reaches the number set in the communication frequency field 404 shown in FIG. 4.

In step S901, the CPU 211 obtains, from the transmission history database stored in the HDD 214, pieces of history information each having the output flag 706 "undone" to be described in a report, the number of which is equal to that designated in the communication frequency field 404, and the process advances to step S902. In step S902, the CPU 211 creates a file of a transmittable communication history report from the pieces of history information obtained in step S901, and the process advances to step S903. In step S903, the CPU 211 transmits the file to the destination designated in the transmission destination field 405 shown in FIG. 4. Next, the process advances to step S904, and the CPU 211 changes, to "done", the output flag 706 corresponding to each piece of history information transmitted in step S903 among the pieces of history information of the transmission history database obtained in step S901, thereby ending the processing.

As described above, according to the first embodiment, if a setting has been made to transmit a communication history report including pieces of history information each having the output flag 706 "undone" to an external apparatus and print it, even if the user has printed the communication history report by a manual operation, the output flag 706 corresponding to each of the pieces of history information is not changed to "done". Consequently, when the number of pieces of transmission history information in the MFP 101 reaches the number designated in advance, and a file in which the pieces of transmission history information are described is automatically transmitted to a transmission designation registered in advance, pieces of transmission history information printed by the manual operation are also transmitted. Therefore, for example, even in an environment where a digital communication history report is transmitted to the file server and managed, it is possible to prevent the pieces of transmission history information printed midway from being determined as transmitted history information and being lost from history information to be transmitted.

If the user prints a communication history report including history information by a manual operation, when no setting is made to transmit the history information, the output flag 706 corresponding to the history information is set to "done". With this processing, when a condition for printing a communication history report is satisfied and the report is automatically printed, the history information included in the report can be excluded from a print target. This can prevent the history information manually instructed and printed by the user from being automatically printed again as a communication history report.

Note that the first embodiment has described a mechanism which does not determine, as a processed transmission history information, transmission history information printed midway even in an environment where a digital communication history report is transmitted to the file server and managed. The present invention, however, is not limited to this. For example, in an environment where a communication management report is printed and a series of pieces of transmission history information is managed, transmission history information transmitted midway may be prevented from being determined as the processed transmission history information and being lost from the transmission history to be printed. More specifically, if a transmission start button is provided on the screen shown in FIG. 6, and is selected, the MFP 101 determines whether or not a setting has been made to select the print button 401 shown in FIG. 4 and execute printing. If printing has not been set, the CPU 211 changes the output flag 706 of the transmitted history information to "done", otherwise, the CPU 211 does not change the output flag 706 of the transmitted history information to "done". This allows the user to manage a series of transmission history information as a printed material. After that, for example, when the number of pieces of history information whose output flag 706 registered in the transmission history database is "undone" reaches the number set in the communication frequency field 404 shown in FIG. 4, automatic printing of the pieces of the transmission history information starts. The output flags of automatically printed pieces of history information are changed to "done".

[Second Embodiment]

The second embodiment of the present invention will be described next. In the second embodiment, two flags, that is, an output flag for printing and an output flag for transmission are provided for each history information in the transmission history database. Note that a system configuration and the hardware arrangements of an MFP 101 and file server 102 according to the second embodiment are the same as in the above-described first embodiment, and a description thereof will be omitted.

FIG. 10 depicts a view showing an example of the structure of data of the transmission history database stored in an HDD 214 of the MFP 101 according to the second embodiment. Note that the same reference numerals denote parts common to FIG. 7 described above, and a description thereof will be omitted. In FIG. 10, each row indicates transmission history information as well as in FIG. 7.

Referring to FIG. 10, a print flag 1006 and a transmission flag 1007 are added, instead of the output flag 706 shown in FIG. 7.

If history information has been printed, "done" is set in the print flag 1006, otherwise, "undone" is set in the print flag 1006. Similarly, if history information has been transmitted, "done" is set in the transmission flag 1007, otherwise, "undone" is set in the transmission flag 1007.

Figure 11:
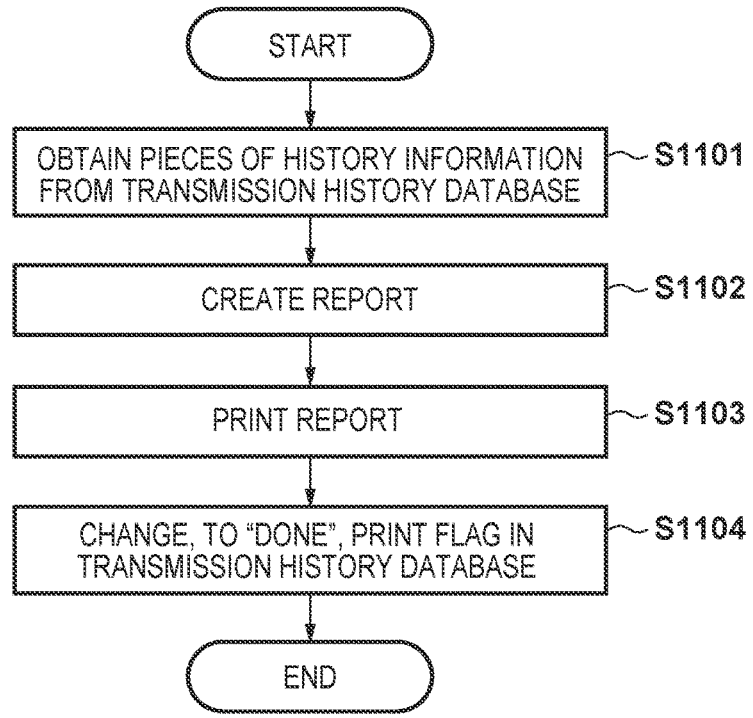
FIG. 11 is a flowchart for describing print processing of communication history report by the MFP according to the second embodiment.

FIG. 11 is a flowchart for describing print processing of communication history report by the MFP 101 according to the second embodiment. Note that this processing is achieved when a CPU 211 executes a program deployed from the HDD 214 to a RAM 213.

Furthermore, the print processing of communication history report starts when, for example, the user presses a "print start" button 602 on a screen shown in FIG. 6. Alternatively, the processing starts when a "print" button 401 is selected on a screen shown in FIG. 4 and the number of pieces of history information whose transmission history print flag 1006 registered in the transmission history database is "undone" reaches the number set in a communication frequency field 404 shown in FIG. 4.

In step S1101, the CPU 211 obtains pieces of history information each having the print flag 1006 "undone" from the transmission history database stored in the HDD 214, and the process advances to step S1102. In step S1102, the CPU 211 creates a printable communication history report from the pieces of history information obtained in step S1101, and the process advances to step S1103. In step S1103, the CPU 211 outputs, to a printer 221 via a printer interface 216, the communication history report created in step S1102, thereby printing it. Upon completion of printing, the process advances to step S1104, and the CPU 211 changes, to "done", the print flag 1006, in the transmission history database, corresponding to each piece of printed history information included in the communication history report, thereby ending the processing.

Figure 12:
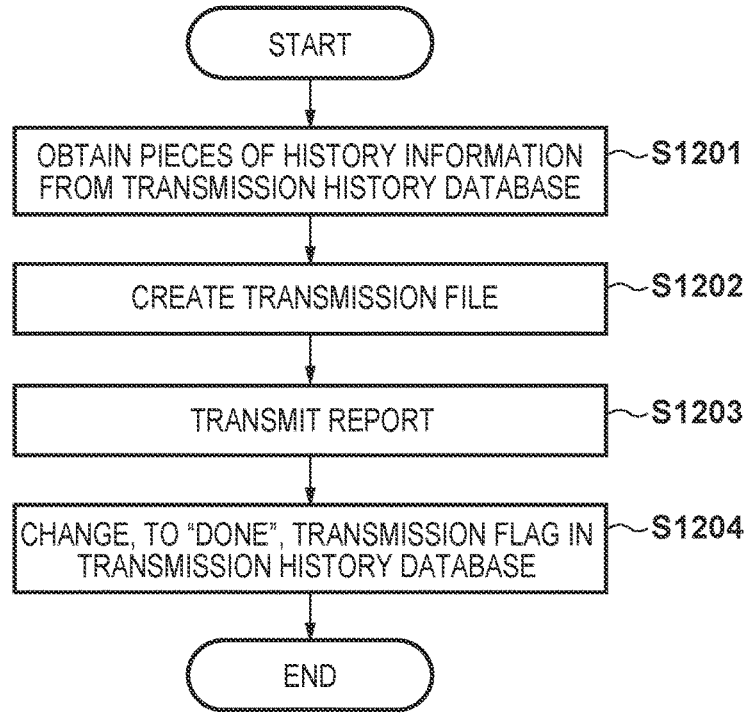
FIG. 12 is a flowchart for describing transmission processing of communication history report by the MFP according to the second embodiment.

FIG. 12 is a flowchart for describing transmission processing of communication history report by the MFP 101 according to the second embodiment. Note that this processing is implemented when the CPU 211 executes a program deployed from the HDD 214 to the RAM 213. The transmission processing of communication history report starts when, for example, a send button 402 is selected on the screen shown in FIG. 4 and the number of pieces of history information whose transmission history transmission flag 1007 registered in the transmission history database is "undone" reaches the number set in the communication frequency field 404 shown in FIG. 4.

In step S1201, the CPU 211 obtains, from the transmission history database stored in the HDD 214, pieces of history information each having the transmission flag 1007 "undone", the number of which is equal to that set in the communication frequency field 404 shown in FIG. 4, and the process advances to step S1202. In step S1202, the CPU 211 creates a file of a transmittable communication history report from the pieces of history information obtained in step S1201, and the process advances to step S1203. In step S1203, the CPU 211 transmits the file created in step S1202 to a destination input to a transmission destination field 405 shown in FIG. 4. Upon completion of transmission, the process advances to step S1204, and the CPU 211 changes, to "done", the transmission flag 1007, in the transmission history database, corresponding to each piece of transmitted history information included in the communication history report, thereby ending the processing.

As described above, according to the second embodiment, flags for managing whether history information has been output are separately managed for print processing and transmission processing. This can prevent history information printed by a manual operation by the user from being determined as processed history information and being lost from history information to be transmitted, even in an environment where a digital communication history report is transmitted to the file server and managed.

(Other Embodiments)

Note that the above-described embodiments have explained an example in which when the "print start" button 602 is selected, pieces of transmission history information the number of which is equal to that set in the number field 601 of output cases are printed. The present invention, however, is not limited to this. For example, the user may select, from the transmission history screen shown in FIG. 5, transmission history information to be output, thereby printing the selected transmission history information. Note that in a case that transmission history information is transmitted by a manual operation by the user, the user may select, from the transmission history screen shown in FIG. 5, transmission history information to be output, thereby transmitting the selected transmission history information.

The above-described embodiments have explained transmission history information or reception history information. However, history information is not limited to it. For example, the history information may be that of a copy job in which the printer 221 prints, on a paper sheet, an image on a document read by the scanner 222. Alternatively, the history information may be that of a print job in which the printer 221 prints an image on a paper sheet based on print data received from an external PC via the LAN 100.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125946, filed Jun. 23, 2015, which is hereby incorporated by reference herein in its entirety.

What is claimed is:

1. A job processing apparatus comprising:
a memory storing a set of instructions; and
one or more processors that execute instructions of the set of the instructions and cause the job processing apparatus to function as:
an executing unit configured to execute a job;
a storage unit configured to store history information of the job executed by the executing unit;
a first output unit configured to output, in accordance with a user instruction, the history information stored in the storage unit;
a setting unit configured to set a type, from among output types, received via a setting screen;
a second output unit configured to automatically output, according to the set type, history information that is not managed as output history information, among the pieces of history information stored in the storage unit; and
a control unit configured to control not to manage, as the output history information, the history information output by the first output unit in a case where the set type is not a predetermined type, and to manage, as the output history information, the history information output by the first output unit in a case where the set type is the predetermined type,
wherein the control unit controls to manage, as the output history information, the history information output by the second output unit.

2. The apparatus according to claim 1, wherein the one or more processors cause the job processing apparatus to further function as:
   a selecting unit configured to select history information from the pieces of history information stored in the storage unit,
   wherein the first output unit outputs the history information selected by the selecting unit.

3. The apparatus according to claim 1, wherein when a number of pieces of history information that are stored in the storage unit and have not been output by the second output unit reaches a predetermined number, the second output unit automatically outputs the pieces of history information.

4. The apparatus according to claim 3, wherein the one or more processors cause the job processing apparatus to further function as:
   a designating unit configured to designate the predetermined number in accordance with a user operation.

5. The apparatus according to claim 1,
   wherein the setting unit further sets a transmission destination of the history information received via the setting screen,
   wherein the second output unit automatically outputs, to the destination set by the setting unit, the history information that is not managed as the output history information, among the pieces of history information stored in the storage unit.

6. The apparatus according to claim 1, further comprising:
   a reading unit configured to read an image on a document to generate image data corresponding to the image,
   wherein the job is a transmission job of transmitting the image data generated by the reading unit.

7. The apparatus according to claim 1, further comprising:
   a reading unit configured to read an image on a document to generate image data corresponding to the image,
   wherein the job is a copy job of printing an image based on the image data generated by the reading unit.

8. The apparatus according to claim 1, further comprising a printer,
   wherein the first output unit outputs the history information by using the printer.

9. The apparatus according to claim 1, further comprising a printer,
   wherein the predetermined type indicates an output using the printer.

10. A method of controlling a job processing apparatus comprising:
    executing a job;
    storing, in a storage unit, history information of the job executed in the executing;
    outputting, in accordance with a user instruction, the history information stored in the storage unit;
    setting a type, from among output types, received via a setting screen;
    automatically outputting, according to the set type, history information that is not managed as output history information, among the pieces of history information stored in the storage unit; and
    controlling not to manage, as the output history information, the history information output in accordance with the user instruction in a case where the set type is not a predetermined type, and to manage, as the output history information, the history information output in accordance with the user instruction in a case where the set type is the predetermined type,
    wherein, in the controlling, the history information automatically output is managed as the output history information.

11. A non-transitory computer readable storage medium storing a program for causing a processor to execute a method of controlling a job processing apparatus, comprising:
    executing a job;
    storing, in a storage unit, history information of the job executed in the executing;
    outputting, in accordance with a user instruction, the history information stored in the storage unit;
    setting a type, from among output types, received via a setting screen;
    automatically outputting, according to the set type, history information that is not managed as output history information, among the pieces of history information stored in the storage unit; and
    controlling not to manage, as the output history information, the history information output in accordance with the user instruction in a case where the set type is not a predetermined type, and to manage, as the output history information, the history information output in accordance with the user instruction in a case where the set type is the predetermined type,
    wherein, in the controlling, the history information automatically output is managed as the output history information.

* * * * *